2,147,741

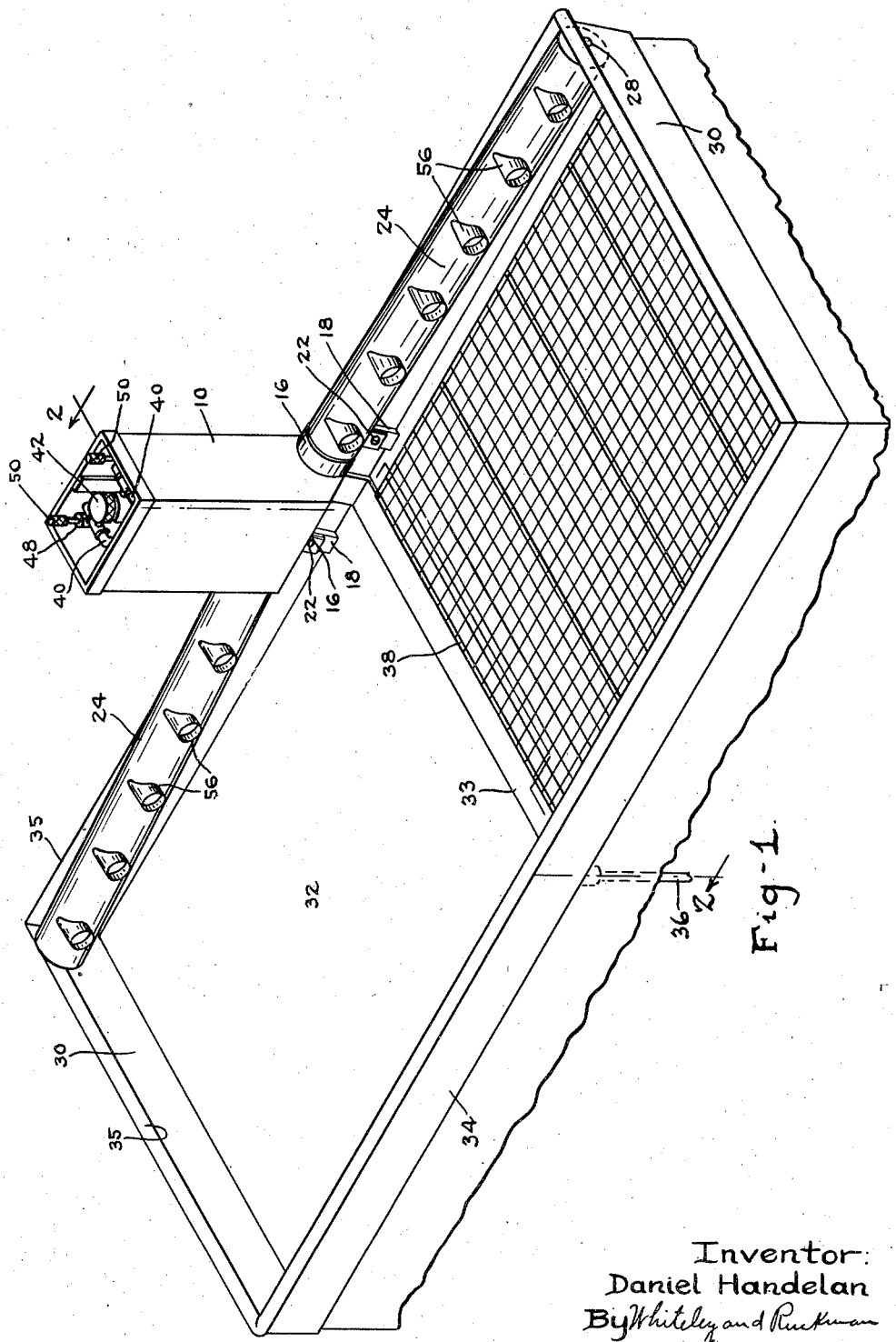
Feb. 21, 1939. D. HANDELAN 2,147,741
APPARATUS FOR CONTROLLING THE DELIVERY OF AIR
Filed Nov. 5, 1937 2 Sheets-Sheet 1
Inventor:
Daniel Handelan
By Whiteley and Ruckman
Attorneys Feb. 21, 1939. D. HANDELAN 2,147,741
APPARATUS FOR CONTROLLING THE DELIVERY OF AIR
Filed Nov. 5, 1937 2 Sheets-Sheet 2
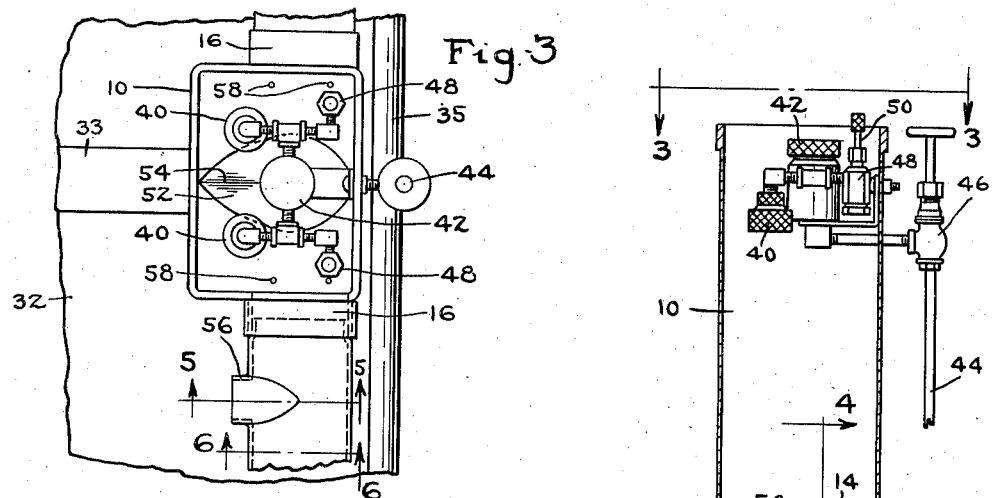
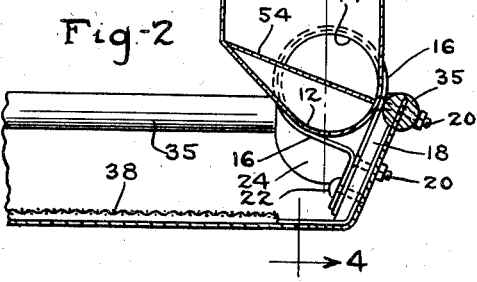
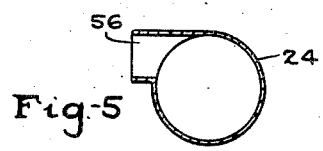
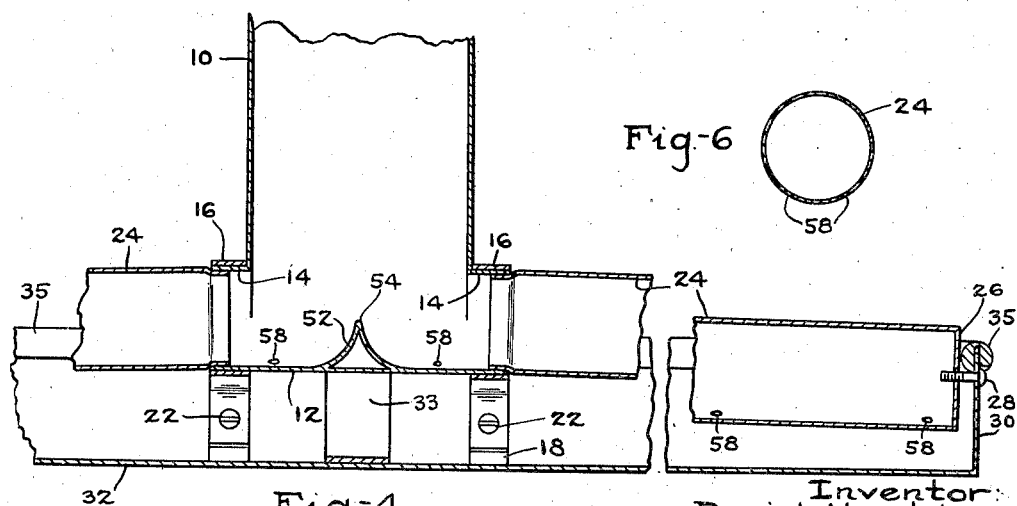
Inventor:
Daniel Handelan.
By Whiteley and Ruckman.
Attorneys Patented Feb. 21, 1939

UNITED STATES PATENT OFFICE 2,147,741

APPARATUS FOR CONTROLLING THE DELIVERY OF AIR

Daniel Handelan, Minneapolis, Minn.

Application November 5, 1937, Serial No. 172,974

2 Claims. (Cl. 261—116)

My invention relates to apparatus for controlling the delivery of air. More specifically, it relates to controlling the delivery of humidified air. While the apparatus is intended more particularly for keeping in fresh condition, articles which have been gathered such as vegetables, fruits, flowers, etc., it is to be understood that the apparatus may be used to advantage for the delivery of humidified air for other purposes. In addition to the objects of the invention above stated, an object is to provide for the delivery of humidified air through openings arranged along the length of pipes combined with means for causing such air to progress through the pipes with a whirling movement whereby the air will be discharged through the openings which are located toward the outer ends of the pipes as well as through the openings which are located toward the inner ends of the pipes. Another object is to provide for delivering water into a current of air either in the form of a spray or a stream or both if desired. Another object is to make certain parts of the apparatus adjustable in order that it may be employed to the best advantage for varying conditions of use.

The novel features which I believe to be characteristic of my invention are set forth with particularity in the appended claims. The invention itself, however, both as to its organization and method of operation, together with additional objects and advantages will be best understood from the following description of a specific embodiment when read in connection with the accompanying drawings in which, Fig. 1 is a perspective view of the apparatus showing the exterior top surface thereof.

Fig. 2 is a view in vertical section on the line 2—2 of Fig. 1.

Fig. 3 is a fragmentary top plan view taken on the line 3—3 of Fig. 2.

Fig. 4 is a view in vertical section on the line 4—4 of Fig. 2.

Fig. 5 is a view in horizontal section on the line 5—5 of Fig. 3.

Fig. 6 is a view in horizontal section on the line 6—6 of Fig. 3.

Referring to the particular construction illustrated in the drawings, my invention includes a casing 10 which has an opening at its outer end for the entrance of air. The casing 10 has a closed bottom 12 as shown in Figs. 2 and 4, but near the bottom at opposite sides is provided with short tubular projections 14 through which the air entering the outer end of the casing is discharged. The projections 14 are encircled by clamping members 16 which are attached at one end to a support 18 by bolts 20 and at the other end are attached to this support by screws 22 as best shown in Fig. 2. It is obvious that upon loosening the screws 22, the casing 10 may be tilted at different angles, and may be placed in either vertical or horizontal position the tubular projections 14 serving as trunnions.

Rotatably mounted in the tubular projections 14 are the reduced inner ends of pipes 24 which instead of being horizontal are preferably slightly inclined downwardly in outward direction. The outer ends of the pipes 24 are closed by members 26 as shown in Fig. 4. Bolts 28 rotatably attach the members 26 to supports 30. The inner ends of the pipes 24 are held frictionally in the projections 14. It is therefore obvious that by the application of requisite force, the pipes 24 may be given rotative movement for the purpose of adjustment. The supports 30 in the embodiment shown constitute upturned edges at the ends of a table having a bottom member 32 upon which is a reinforcing strip 33 as shown in Fig. 1. The support 18 constitutes part of the rear upturned side of the table which has a front upturned side 34. The upturned periphery of the table is provided with a bead 35. The bottom 32 preferably inclines slightly downwardly in forward direction and near its front side is provided with a drain pipe 36 adjacent which are two filler plates 37 at the forward end of the strip 33. As shown in Figs. 1 and 2, one or more wire mesh members 38 may be supported slightly above the bottom 32 to serve as a support for articles which are to be kept in fresh condition. The wire members 38 fit against the filler plates 37.

Suitable means is provided for causing air to flow into the outer end of the casing 10 and for humidifying the inflowing air. In the embodiment shown, there are two spray nozzles 40 located in the outer portion of the casing 10. These nozzles are connected to a filter 42 which in turn is connected to a source of water supply which includes a pipe 44 provided with a shut off cock 46 which may also be used to regulate the quantity of water. The inwardly directed sprays of water in the casing 10 will cause air to be drawn in at the outer portion thereof. The filter 42 is shown as also being connected to two valve casings 48 open at their inner ends and provided with valves having valve stems 50 by means of which the valves may be closed or opened to any desired extent. When the valves are opened, streams of water will be delivered toward the bottom of the casing 10.

A deflector 52 is supported in medial position upon the bottom 12 of the casing 10. This deflector consists of two concave elements placed together so as to form an apex 54 which splits the incoming current of air and causes it to pass out in opposite directions through the tubular projections 14 and the pipes 24 connected therewith. The deflector 52 is so shaped that the air introduced into the pipes 24 is caused to have a whirling action. These pipes are provided with a series of tubular projections 56 which extend forwardly above the rear portion of the table member 32. The pipes 24 near their lower sides and also the casing bottom 12 are provided with perforations 58 through which water passes when the valves in the valve casings are open. As shown in Figs. 1, 3 and 5, the capacity of each tubular projection 56 is materially less than the capacity of the pipe 24.

The operation and advantages of my invention will be understood in connection with the foregoing description and the accompanying drawings. Broadly considered, the invention comprises a passageway for air, means for causing air to flow inwardly through said passageway, means for humidifying the air, pipes into which the humidified air is delivered, said pipes having a series of openings along their length through which the air is discharged, and means for giving the air in the pipes a whirling movement which causes the air to be carried along the pipes for discharging through all of said openings. In the specific embodiment shown for illustrative purposes, the downwardly directed sprays of water delivered through the nozzles 40 cause air to flow downwardly through the casing 10 and to be humidified therein. The current of humidified air is split by the deflector 52 and caused to progress with a whirling motion through the pipes 24. This whirl causes the air to be discharged through the tubular projections 56 which are located toward the outer ends of the pipes as well as through the tubular projections located toward the inner ends of these pipes. When the apparatus is employed for keeping in fresh condition vegetation such as vegetables, fruits, flowers, etc., such articles are placed upon the table member 32 or the wire mesh members 38. The filtered and humidified air is delivered through the tubular projections 56 upon the articles which are to be maintained in fresh condition. The humidified air thus delivered will not only have this effect, but has been found to have considerable effect in restoring to fresh condition, articles which have started to wilt. Surplus water is disposed of by the drain pipe 36. For some articles it may be desirable to run a stream of water down the inclined table member 32. In such case, the valves in the valve casings 48 are opened to the desired extent. Regardless of whether a spray of water or a stream of water or both is employed, the water is delivered in clean condition by passing through the filter 42. In order to adapt the apparatus for functioning to the best advantage, the casing 10 may be tilted either forwardly or backwardly and the pipes 24 may be turned to tilt the delivery projections 56 either upwardly or downwardly. The apparatus may be supported in any suitable manner and placed in any desired location in order to accommodate it to the particular conditions found to exist. For instance when the apparatus is employed for keeping vegetation in fresh condition, the apparatus may be placed inside of a window to constitute a window display. In such case it is obvious that the casing 10 may be turned into a horizontal position above the screen 38. It is further obvious that the stream of air passing into the outer end of the casing 10 and delivered out through the tubular projections 56 will draw air from adjacent the inner surface of the window and serve to prevent the formation of frost on the window in cold weather. Furthermore when water is delivered under the screen 38 upon opening the valve 48, it acts to cool the air adjacent the vegetation on account of vaporization of the water. Also the stream of water running down the inclined table absorbs and carries away bacteria and odors taken off the vegetation by the sprays of humidified air delivered above the vegetation, thus acting to prevent spoiling of the vegetation even when it remains on the screen for a considerable period of time.

Although I have shown and described a specific embodiment of my invention, I am fully aware that other embodiments are possible. My invention, therefore, is not to be restricted except insofar as may be necessitated by the prior art and by the spirit of the following claims.

I claim:

1. In an apparatus for controlling the delivery of air, the combination of a casing having a bottom member, means for causing air to flow inwardly in said casing, pipes extending out in opposite directions from the inner end of said casing and provided with discharge openings for the air along their length, and a deflector mounted in medial position on said bottom member which splits the current of air and gives a whirling movement to the air as it progresses through said pipes.

2. In an apparatus for controlling the delivery of air, the combination of a casing, means for humidifying and causing air to flow inwardly in said casing, a pipe extending out from the inner end of said casing, a table member having one of its sides underneath said casing, a support for articles to be conditioned in spaced relation above said table member, said pipe being provided with discharge openings along its length for discharge of air above said support, and means for giving a whirling movement to the air as it progresses through said pipe, the lower side of said pipe being provided with perforations for escape underneath said support of drops of water thrown out centrifugally by said whirling movement.

DANIEL HANDELAN.